(12) United States Patent
Kawase (10) Patent No.: US 11,415,869 B2
(45) Date of Patent: Aug. 16, 2022

(54) ELECTRONIC DEVICE AND PROJECTORS

(71) Applicant: Sharp NEC Display Solutions, Ltd., Tokyo (JP)

(72) Inventor: Ryosuke Kawase, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 17/058,053

(22) PCT Filed: May 25, 2018

(86) PCT No.: PCT/JP2018/020099
§ 371 (c)(1),
(2) Date: Nov. 23, 2020

(87) PCT Pub. No.: WO2019/224992
PCT Pub. Date: Nov. 28, 2019

(65) Prior Publication Data
US 2021/0157220 A1    May 27, 2021

(51) Int. Cl.
*G03B 21/16*   (2006.01)
*G02F 1/13*    (2006.01)
*G02F 1/1333*  (2006.01)

(52) U.S. Cl.
CPC .......... *G03B 21/16* (2013.01); *G02F 1/1313* (2013.01); *G02F 1/133385* (2013.01)

(58) Field of Classification Search
CPC .. G03B 21/16; G02F 1/1313; G02F 1/133385
USPC ......................................................... 353/57
See application file for complete search history.

(56) References Cited

U.S. PATENT DOCUMENTS

| | | |
|---|---|---|
| 6,231,191 B1 | 5/2001 | Shiraishi et al. |
| 6,290,360 B1 | 9/2001 | Konuma et al. |
| 2002/0191158 A1 | 12/2002 | Koyama et al. |
| 2005/0213049 A1 | 9/2005 | Hamada et al. |
| 2008/0055563 A1 | 3/2008 | Momose et al. |
| 2011/0273656 A1 | 11/2011 | Park et al. |
| 2014/0333904 A1 | 11/2014 | Saito |

FOREIGN PATENT DOCUMENTS

| | | |
|---|---|---|
| CN | 1463386 A | 12/2003 |
| CN | 101046619 A | 10/2007 |
| CN | 101271264 A | 9/2008 |
| CN | 101668408 A | 3/2010 |
| CN | 101713907 A | 5/2010 |
| CN | 102124408 B | 10/2013 |

(Continued)

OTHER PUBLICATIONS

Translation of 2009065313 (Year: 2021).*

(Continued)

*Primary Examiner* — Jerry L Brooks
(74) *Attorney, Agent, or Firm* — McGinn IP Law Group, PLLC (57) ABSTRACT

An electronic device includes blowers. Blowers cool liquid crystal panels for light modulation mounted on illumination optical system for outputting light to a projection lens, respectively, and are disposed on the opposite side to the side where the projection lens of three liquid crystal panels is disposed and are arranged side by side along a first direction facing two liquid crystal panels of three liquid crystal panels.

14 Claims, 13 Drawing Sheets

(56) References Cited

FOREIGN PATENT DOCUMENTS

| | | | |
|---|---|---|---|
| CN | 106814527 A | 6/2017 | |
| JP | 2002-341445 A | 11/2002 | |
| JP | 2002-357865 A | 12/2002 | |
| JP | 2003-005290 A | 1/2003 | |
| JP | 2003-005291 A | 1/2003 | |
| JP | 2003-005292 A | 1/2003 | |
| JP | 2003-005293 A | 1/2003 | |
| JP | 2003-066534 A | 3/2003 | |
| JP | 3467697 B2 | 11/2003 | |
| JP | 2004-061965 A | 2/2004 | |
| JP | 2004-109731 A | 4/2004 | |
| JP | 2004-138911 A | 5/2004 | |
| JP | 2006-227052 A | 8/2006 | |
| JP | 2007-226266 A | 9/2007 | |
| JP | 2008-026422 A | 2/2008 | |
| JP | 2008-298998 A | 12/2008 | |
| JP | 2009-065313 A | 3/2009 | |
| JP | 2009-075235 A | 4/2009 | |
| JP | 2009065313 W * | 9/2009 | ............ G03B 21/14 |
| JP | 2010-078688 A | 4/2010 | |
| JP | 2011-076069 A | 4/2011 | |
| JP | 2013-041307 A | 2/2013 | |
| JP | 2016-080957 A | 5/2016 | |
| TW | 427511 U | 3/2001 | |
| WO | WO 2010/018638 A1 | 2/2010 | |
| WO | WO 2011/027424 A1 | 3/2011 | |
| WO | WO 2019/224992 A1 | 11/2019 | |
| WO | WO 2019/225680 A1 | 11/2019 | |

OTHER PUBLICATIONS

Japanese Office Action, dated Jul. 6, 2021, in Japanese Application No. 2020-520355 and English Translation thereof.
Japanese Office Action, dated Jul. 6, 2021, in Japanese Application No. 2020-520973 and English Translation thereof.
International Search Report (Isr) (PCT Form PCT/ISA/210), in PCT/JP2018/020099, dated Aug. 7, 2018.
Chinese Office Action, dated Aug. 19, 2021, in Chinese Application No. 201880093824.4 and English Translation thereof.
Chinese Office Action, dated Aug. 19, 2021, in Chinese Application No. 201980035296.1 and English Translation thereof.
Japanese Office Action, dated Oct. 12, 2021, in Japanese Application No. 2020-520355 and English Translation thereof.
Chinese Office Action, dated Apr. 19, 2022, in Chinese Application No. 201980035296.1 and English Translation thereof.

* cited by examiner

Cooling duct(upper housing)

Cooling duct(lower housing)

FIG.11

After assembling

ELECTRONIC DEVICE AND PROJECTORS

TECHNICAL FIELD

The present invention relates to electronic device and projectors.

BACKGROUND ART

Main modules constituting a projection type display device for projecting an image include light sources such as lamps, lasers, and LEDs (Light Emitting Diode), illumination optical systems, projection lenses, electronic substrates, and power supplies. Optical electronic components for generating images using an optical modulator such as DMD (Digital Mirror Device) or a liquid crystal panel are mounted on the illumination optical system. In response to an external video signal, an electronic substrate generates a drive signal for driving the optical modulator. Strong light is sent from the light source of the lamp or laser/LED to the illumination optical system and irradiates the light modulator through each optical component. The projection lens enlarges the light emitted from the light modulator and projects it on the screen.

In these processes, the electronic component generates heat due to electrical resistance, the optical component temperature rise due to the absorption of light is generated. Each component must be operated so as not to exceed the allowable temperature to achieve the desired performance. Therefore, a plurality of cooling fans are mounted in the device, the blower from the cooling fan cools each component, to prevent a temperature increase so as not to exceed the allowable temperature. Further, since the life time of the liquid crystal panel is determined according to the temperature, it is necessary to further reduce the temperature.

In order to cool liquid crystal panels and peripheral optical components, cooling air blown out from a blower fan, which is generally arranged around an illumination optical system, is guided to liquid crystal panels and optical components using a cooling duct. In 3LCD (Liquid Crystal Display) optical illumination system in which the direction in which the integrators and PBSs (Polarizing Beam Splitter) are arranged side by side is perpendicular to the projection direction of the image, the illumination optical system becomes a rectangular optical layout because it is long in the optical axis direction of the integrator and short in the direction perpendicular to the optical axis direction of the integrator.

Figure 12:
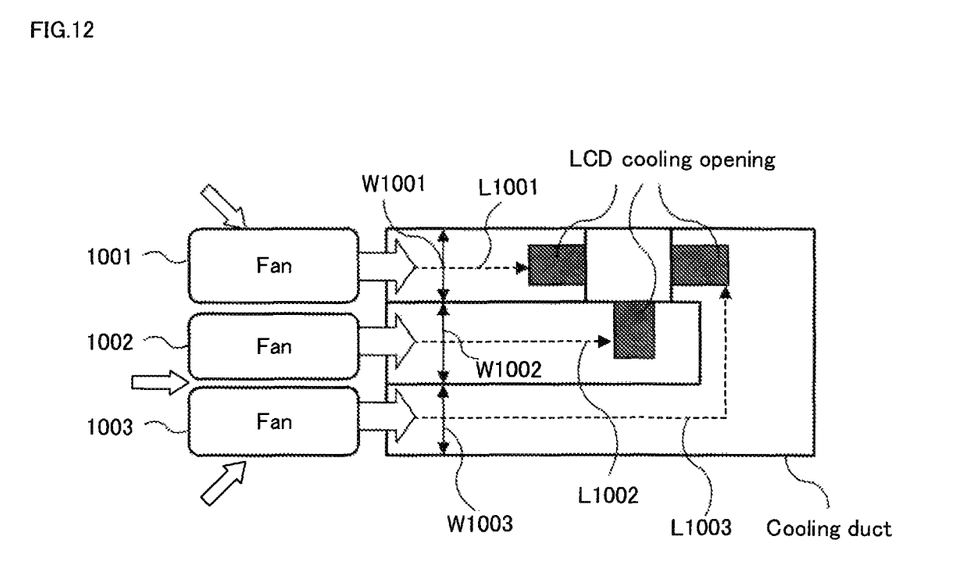
FIG. 12 is a diagram illustrating an exemplary arrangement of fans and cooling openings of the liquid crystal panel in the illumination optical system of a common 3LCD.

FIG. 12 is a diagram illustrating an exemplary arrangement of fans and cooling openings of a liquid crystal panel in an illumination optical system of a common 3LCD. As in the example shown in FIG. 12, in an illumination optical system of a common 3LCD, a rectangular optical layout in which a direction in which two liquid crystal panels of the three liquid crystal panels face each other is a long side is formed, and there are many cases in which fans 1001 to 1003, which are three fans for cooling each of the three liquid crystal panels, are arranged side by side in a direction of a short side thereof.

Figure 13:
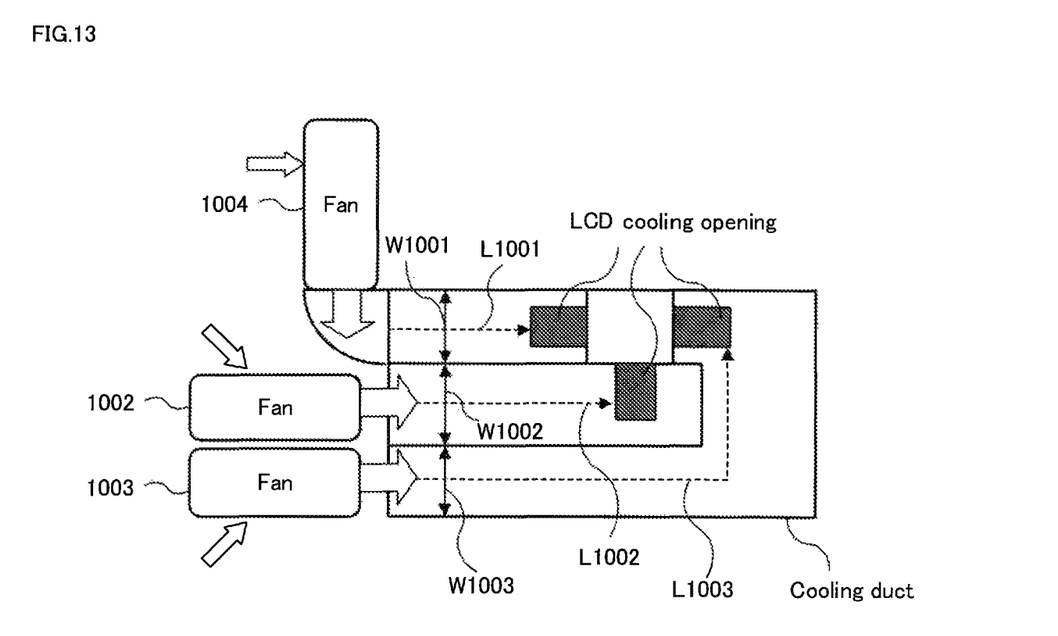
FIG. 13 is a diagram illustrating another exemplary arrangement of fans and cooling openings of the liquid crystal panel in the illumination optical system of a common 3LCD.

FIG. 13 is a diagram illustrating another exemplary arrangement of fans and cooling openings of a liquid crystal panel in a common 3LCD of illumination optics. As in the example shown in FIG. 13, in order to increase the intake area of the fan as compared with the example shown in FIG. 12, there is a case where the arrangement angle of one fan 1004 with respect to the illumination optical system is changed.

Also, a pair of fans are respectively arranged on both sides of the projection lens, an apparatus for performing cooling is considered (e.g., see Patent Document 1).

PRIOR ART DOCUMENTS

Patent Document

[Patent Document 1] U.S. Pat. No. 3,467,697

SUMMARY OF THE INVENTION

Problem to be Solved by the Invention

In the arrangement shown in FIG. 12, the width W1001 to W1003 of the flow path (cooling duct) through which the cooling air flows will be narrowed, efficient cooling is not performed. Further, the length L1003 of the flow path becomes longer than the length L1001, L1002, which leads to lowering the cooling-efficiency. Further, in the arrangement shown in FIG. 13, it becomes a cause of a large pressure loss when angled by the air guiding by the duct. Further, in the device as described in Patent Document 1, there is a problem that the number of fans for cooling the three liquid crystal panels is limited to two.

Thus, there is a problem in which it is impossible to perform efficient cooling.

An object of the present invention is to provide an electronic device and a projector to solve the problems described above.

A Means for Solving the Problem

The electronic device of the present invention,
an electronic device, comprising:
three blowers, wherein
the three blowers cool each of three liquid crystal panels, mounted on an illumination optical system for outputting light to a projection lens for light modulation, and are disposed on the side opposite to the side where the projection lens of the three liquid crystal panels is disposed and are arranged side by side along a first direction facing the two liquid crystal panels of the three liquid crystal panels.

Further, the projector of the present invention,
a projector, comprising:
an electronic device, comprising
a plurality of blowers, wherein
the plurality of blowers cool each of three liquid crystal panels, mounted on an illumination optical system for outputting light to a projection lens for light modulation, and are disposed so that the rotation axis of the motor of the blowers is arranged along a first direction in which the two liquid crystal panels of the three liquid crystal panels face each other on the opposite side of the three liquid crystal panels from the projection lens side,
the projection lens; and
a light source, wherein
the electronic device that receives the light from the light source and modulates the incident light.

Effect of the Invention

According to the present invention, high cooling efficiency can be obtained.

EXEMPLARY EMBODIMENT

It will be described below with reference to the accompanying drawings embodiments of the present invention.

First Embodiment

Figure 1:
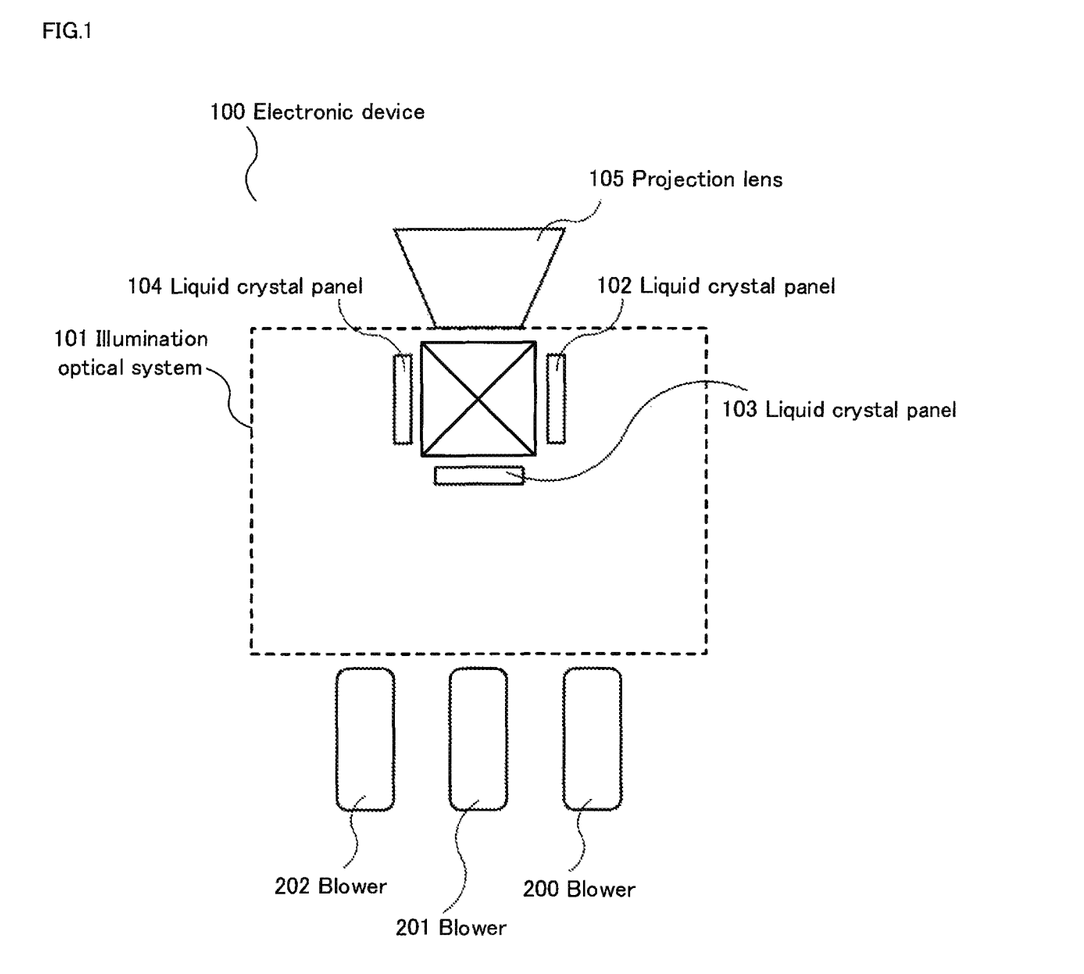
FIG. 1 is a diagram illustrating a first embodiment of the electronic device of the present invention.

FIG. 1 is a diagram illustrating a first embodiment of the electronic device of the present invention. Electronic device 100 in this embodiment includes illumination optical system 101 and blowers 200 to 202 as shown in FIG. 1. Illumination optical system 101 outputs light to projection lens 105 for projecting light. Blowers 200-202 cool each of three liquid crystal panels 102 to 104 mounted on illumination optical system 101. The blowers 200 to 202 are arranged side by side along a first direction in which two liquid crystal panels 102 and 104 of the three liquid crystal panels 102 to 104 face each other on the side opposite to projection lens 105 side of three liquid crystal panels 102 to 104. Liquid crystal panels 102 to 104 are modulating elements that perform light modulation.

Thus, in the electronic device for projecting an image using three liquid crystal panels, along a direction in which the two liquid crystal panels facing each other, blowers for cooling the three liquid crystal panels are arranged side by side. Thus, it is possible to increase the cooling efficiency.

Second Embodiment

Figure 2:
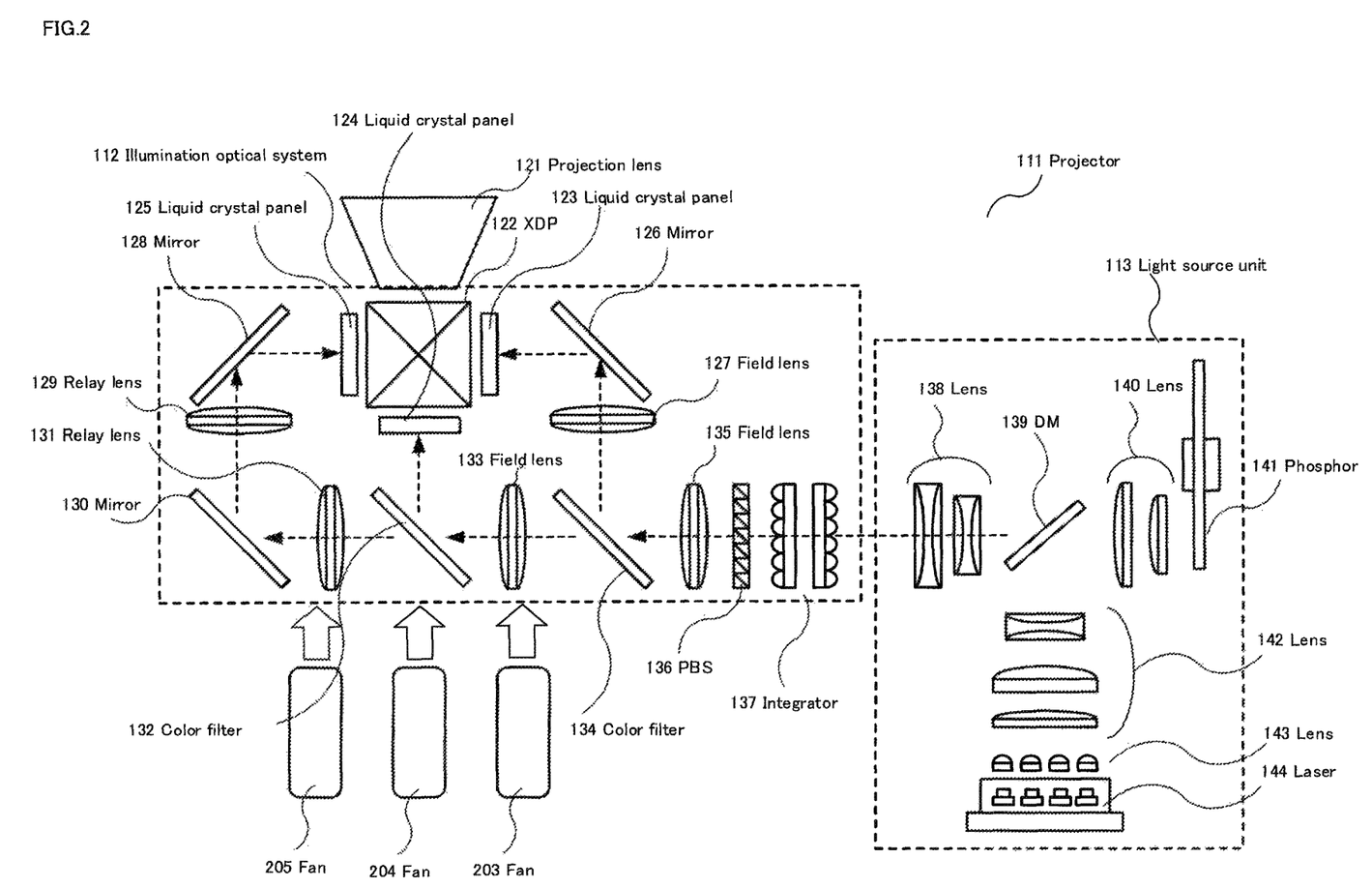
FIG. 2 is a diagram illustrating a second embodiment of the electronic device of the present invention.

FIG. 2 is a diagram illustrating a second embodiment of the electronic device of the present invention. Projector 111, which is an electronic device in this embodiment, as shown in FIG. 2, has illumination optical system 112 and light source unit 113.

Illumination optical system 112 that is provided projection lens 121 has a XDP122 which is a cross dichroic prism, three liquid crystal panels 123-125, mirror 126, field lens 127, mirror 128, relay lens 129, mirror 130, relay lens 131, color filter 132, field lens 133, color filter 134, field lens 135, PBS (Polarizing Beam Splitter) 136 which is a polarizing beam splitter, and integrator 137. Light source unit 113 includes lens 138, DM139, lens 140, phosphor 141, lens 142, lens 143, and laser 144. Each component of illumination optical system 112 and light source unit 113 is identical to that of a typical projector.

Light from laser 144 is output using other components constituting light source unit 113. Also, in this embodiment, of the light that passed through integrator 137, PBS136 and field lens 135, blue light is reflected by color filter 134, passes through field lens 127 and is reflected by mirror 126. Also, of the light that has passed through integrator 137, PBS136 and field lens 135, green light passes through color filter 134 and field lens 133 and is reflected color filter 132. Also, of the light that has passed through integrator 137, PBS136 and field lens 135, red light passes through color filter 134, field lens 133, color filter 132 and relay lens 131, is reflected by mirror 130, passes through relay lens 129 and is reflected by mirror 128. Therefore, liquid crystal panel 123 modulates the blue light. Further, liquid crystal panel 124 modulates the green light. Further, liquid crystal panel 125 modulates the red light.

In the arrangement of such a 3LCD, the planar shape of illumination optical system 112 is a rectangle in the direction in which liquid crystal panel 123 and liquid crystal panel 125 face the long side.

Fans 203 to 205, which are blowers, are provided to cool liquid crystal panels 123-125, respectively. Fans 203 to 205 are arranged side by side along a first direction in which liquid crystal panel 123 and liquid crystal panel 125 of liquid crystal panels 123 to 125 face each other on a side opposite to the side in which projection lens 121 of liquid crystal panels 123 to 125 is disposed. Incidentally, when the components constituting illumination optical system 112 are housed in one rectangular parallelepiped that can store their layout (broken line of illumination optical system 112 shown in FIG. 2) or a housing having a shape corresponding thereto, fans 203 to 205 are disposed on the surface side facing the surface on which projection lens 121 of the housing is disposed. In that case, fans 203 to 205 may be disposed within the housing or may be disposed outside the housing.

Figure 3:
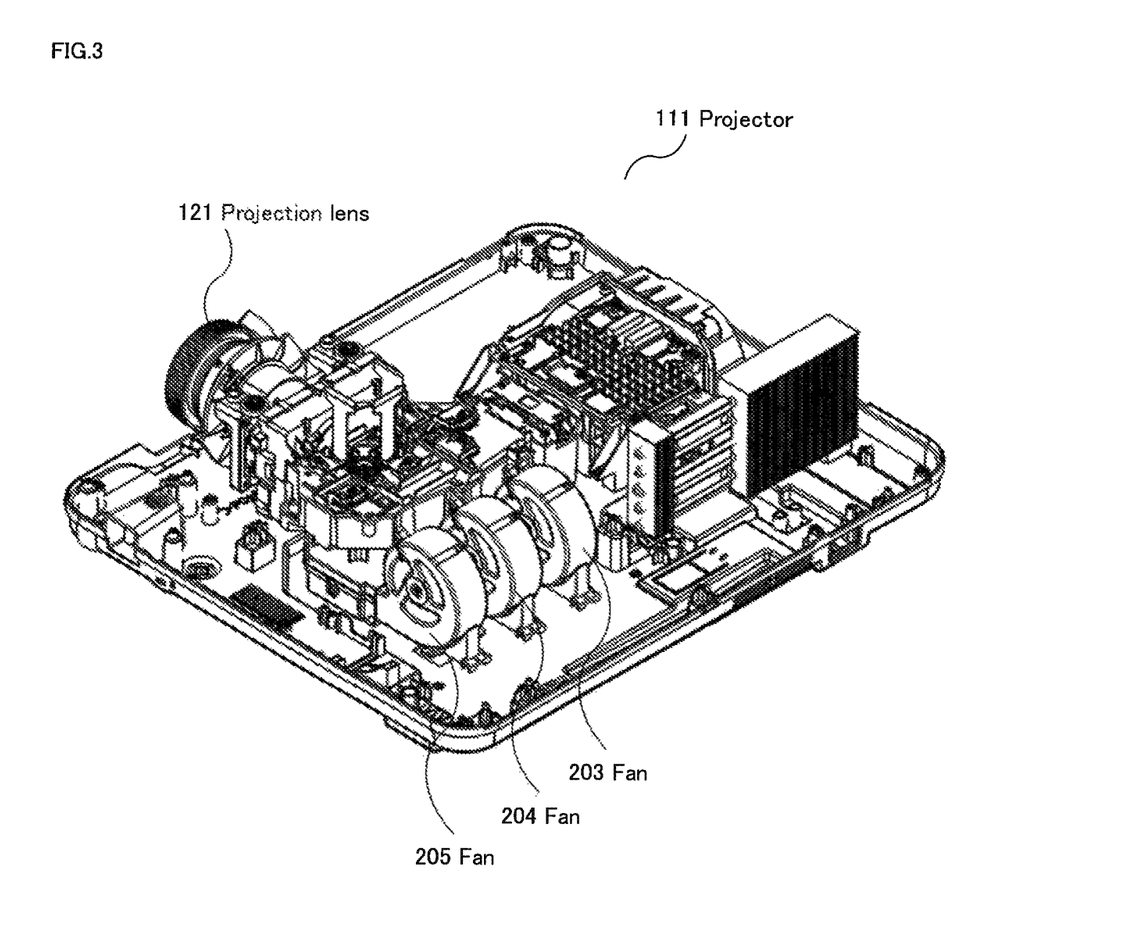
FIG. 3 is a diagram illustrating an example of the appearance of the projector in this embodiment.

FIG. 3 is a diagram illustrating an example of the appearance of projector 111 in this embodiment. As shown in FIG. 3, three fans 203 to 205 are arranged side by side on the side where projection lens 121 of the illumination optical system is not disposed along the long side.

Figure 4:
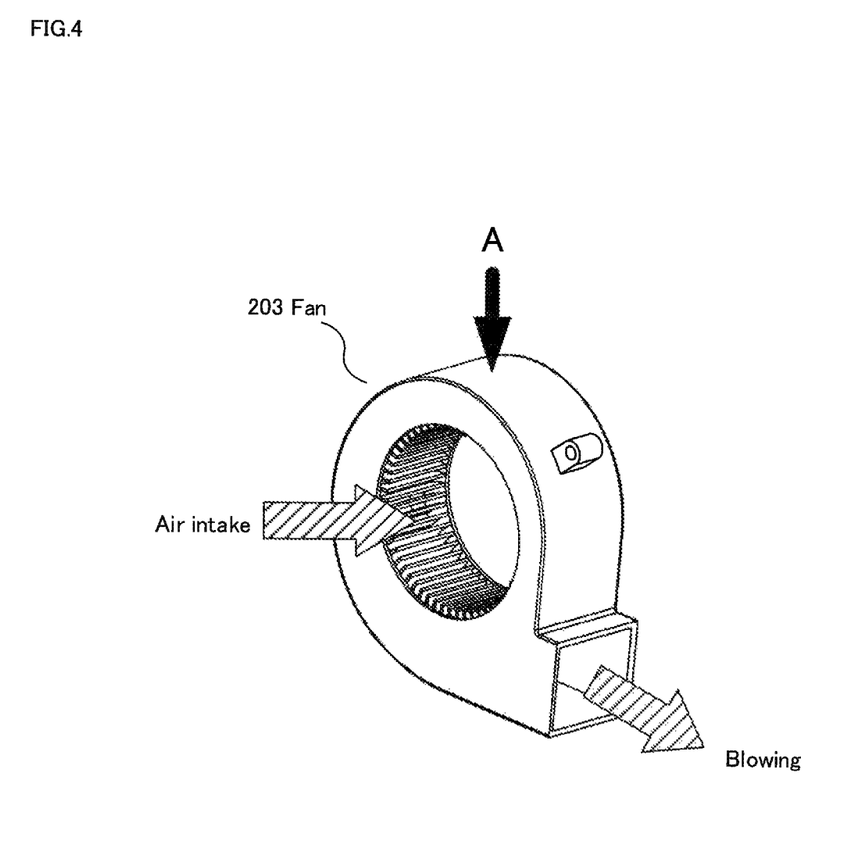
FIG. 4 is a diagram illustrating an example of the appearance of the fan shown in FIG. 2.
Figure 5:
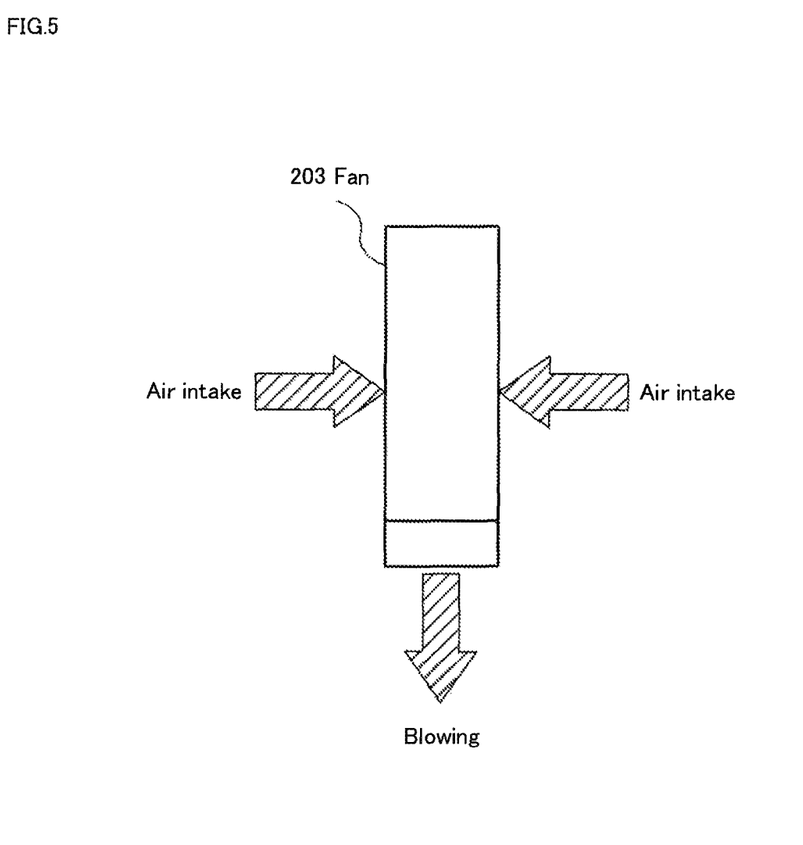
FIG. 5 is a plan view of the fan shown in FIG. 4 viewed from the direction of A.

FIG. 4 is a diagram illustrating an example of the appearance of fan 203 shown in FIG. 2. FIG. 5 is a plan view of fan 203 shown in FIG. 4 viewed from the direction of A. Incidentally, the same applies to fan 204,205 shown in FIG. 2. As shown in FIGS. 4 and 5, fan 203 in this embodiment performs air intake from the side surface of fan 203, and is a blower fan for blowing in a direction perpendicular to the direction of the air inlet. That is, fan 203 is a blower fan which the direction of the air inlet is perpendicular to the direction of the air outlet, and is characterized by a high static pressure. Incidentally, in the example shown in FIG. 5, as an example in which air intake is performed from both sides of fan 203, air intake may be performed from only one side.

Incidentally, the rotation of fans 203 to 205 is individually controlled, and the rotational speed may be different from each other. This rotational speed may be set in advance based on the operation of the light modulation in liquid crystal panels 123 to 125, may be one that measures the temperature of liquid crystal panels 123 to 125 and is controlled based on the measured temperature, or may be one that is controlled based on the use period of liquid crystal panels 123 to 125.

Figure 6:
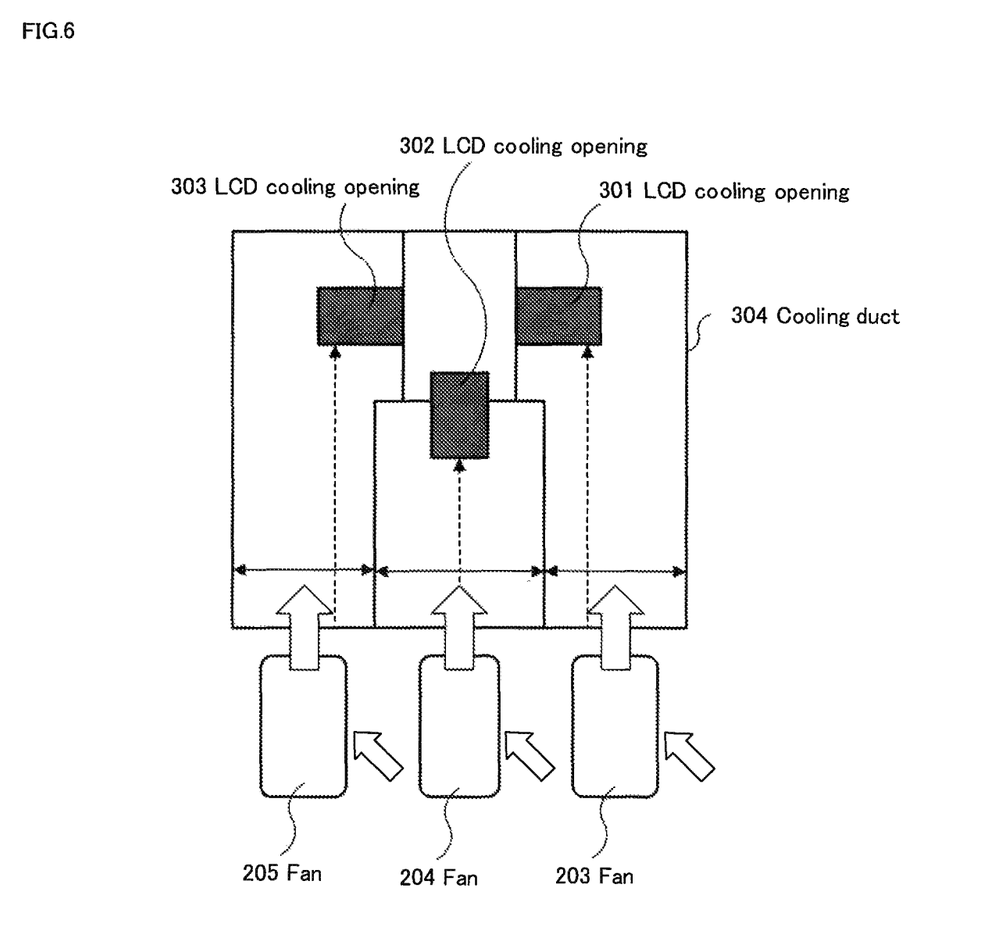
FIG. 6 is a plan view illustrating an example of a configuration of a cooling duct for guiding the cooling air blown out from the fan shown in FIG. 2 to the liquid crystal panel.

FIG. 6 is a plan view illustrating an example of a configuration of a cooling duct for guiding the cooling air blown out from fans 203 to 205 shown in FIG. 2 to liquid crystal panels 123 to 125. As shown in FIG. 6, the cooling air blown out from fans 203 to 205 passes through the respective spaces provided in cooling duct 304 and is guided to LCD cooling openings 301 to 303 for cooling liquid crystal panels 123 to 125, respectively.

Incidentally, fans 203 to 205 are arranged at intervals at which a predetermined intake amount can be secured. Further, a partition plate may be provided between each of fans 203 to 205. Further, when fans 203 to 205 perform air intake from both sides, the position of the partition plate may be determined based on the ratio of the air intake capacity from one side to the air intake capacity from the other side. Specifically, for example, when the air intake capacity from the left side surface of fans 203 to 205 is larger than the air intake capacity from the right side surface, the distance from the left side surface of fans 203 to 205 to the partition plate on the left side may be longer than the distance from the right side surface of fans 203 to 205 to the partition plate on the right side.

Also, the positions of the respective air outlets of fans 203 to 205 with respect to cooling ducts 304, i.e., the distances from the air outlets of fans 203 to 205 to the receptacles of cooling ducts 304, are preferably equal to each other.

Further, as shown in FIG. 6, since liquid crystal panels 123 to 125 are arranged as shown in FIG. 2, LCD cooling openings 301 to 303 for cooling liquid crystal panels 123 to 125, respectively, are arranged at different distances from each other from fans 203 to 205, as shown in FIG. 6. That is, as shown in FIG. 6, among fans 203 to 205, the distance from the air outlet of fan 204 disposed in the center to LCD cooling opening 302 (liquid crystal panel 124) is shorter than the distance from the air outlet of fan 203, 205 to LCD cooling opening 301, 303 (liquid crystal panel 123, 125) respectively.

Figure 7:
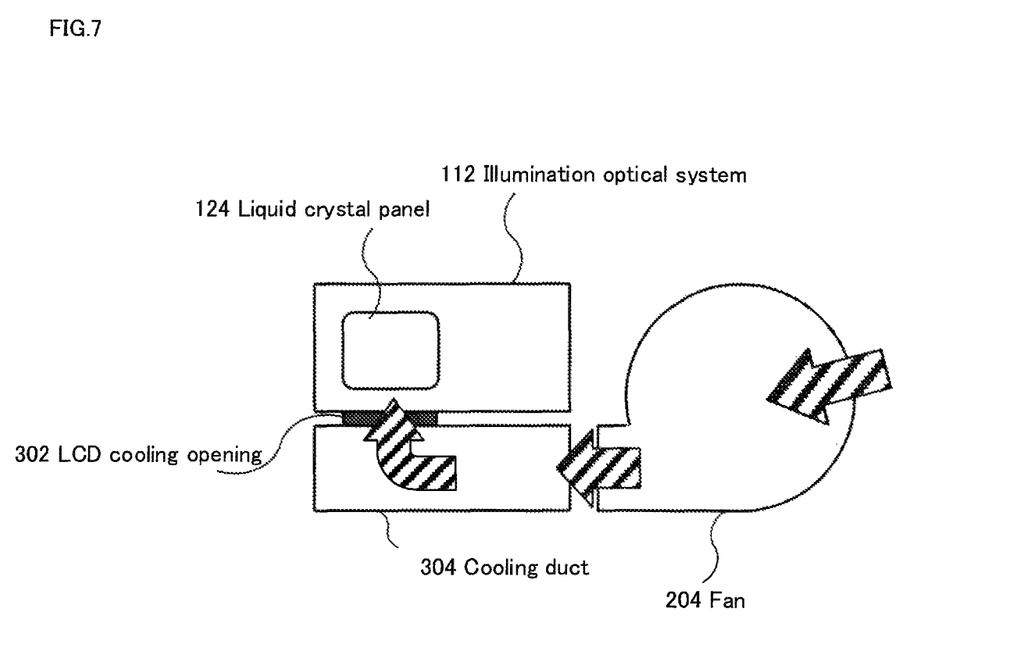
FIG. 7 is a side view of the fan, cooling duct and illumination optical system shown in FIG. 6 viewed from the side direction of the projector.

FIG. 7 is a side view of fan 204, cooling duct 304 and illumination optical system 112 shown in FIG. 6, viewed from the side direction of projector 111. As shown in FIG. 7, cooling duct 304 is disposed at the bottom of illumination optical system 112. Cooling air blown out from fan 204 cools liquid crystal panel 124 from LCD cooling opening 302 through cooling duct 304.

Figure 8:
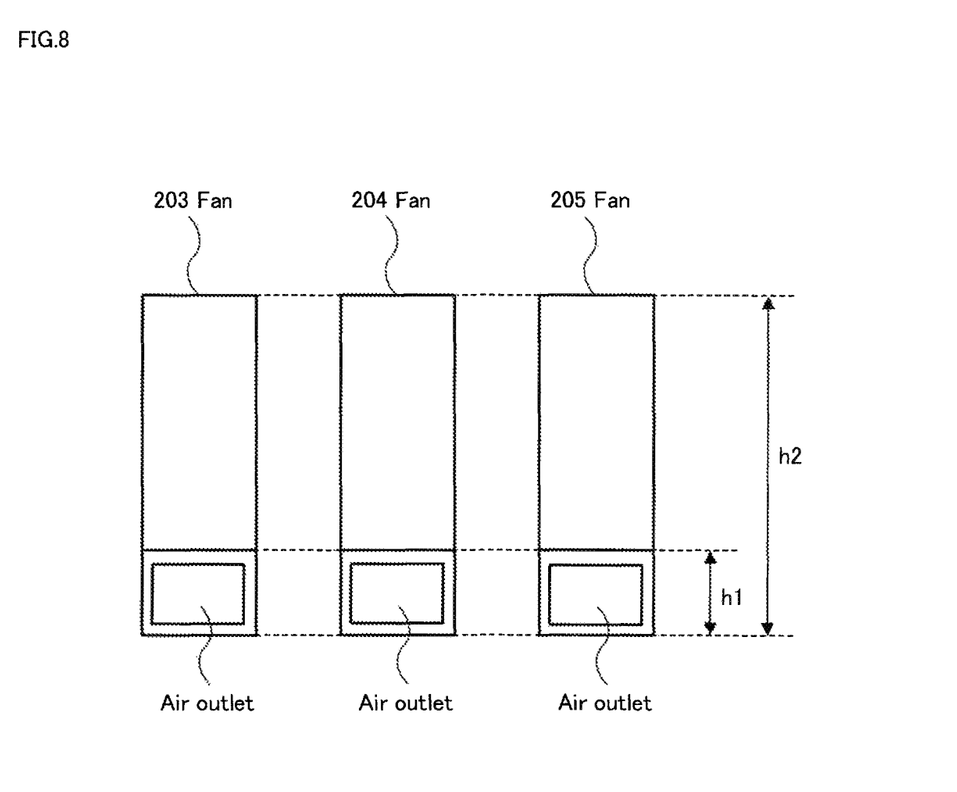
FIG. 8 is a diagram of the arrangement of the fan shown in FIG. 2 viewed from the side of the illumination optical system.

FIG. 8 is a diagram of the arrangement of fans 203 to 205 shown in FIG. 2 viewed from the side of the illumination optical system 112. As shown in FIG. 8, it is preferable that fans 203 to 205 have the same height h1 of the air outlet. Fans 203-205 may also have their own heights h2 identical to each other.

Figure 9:
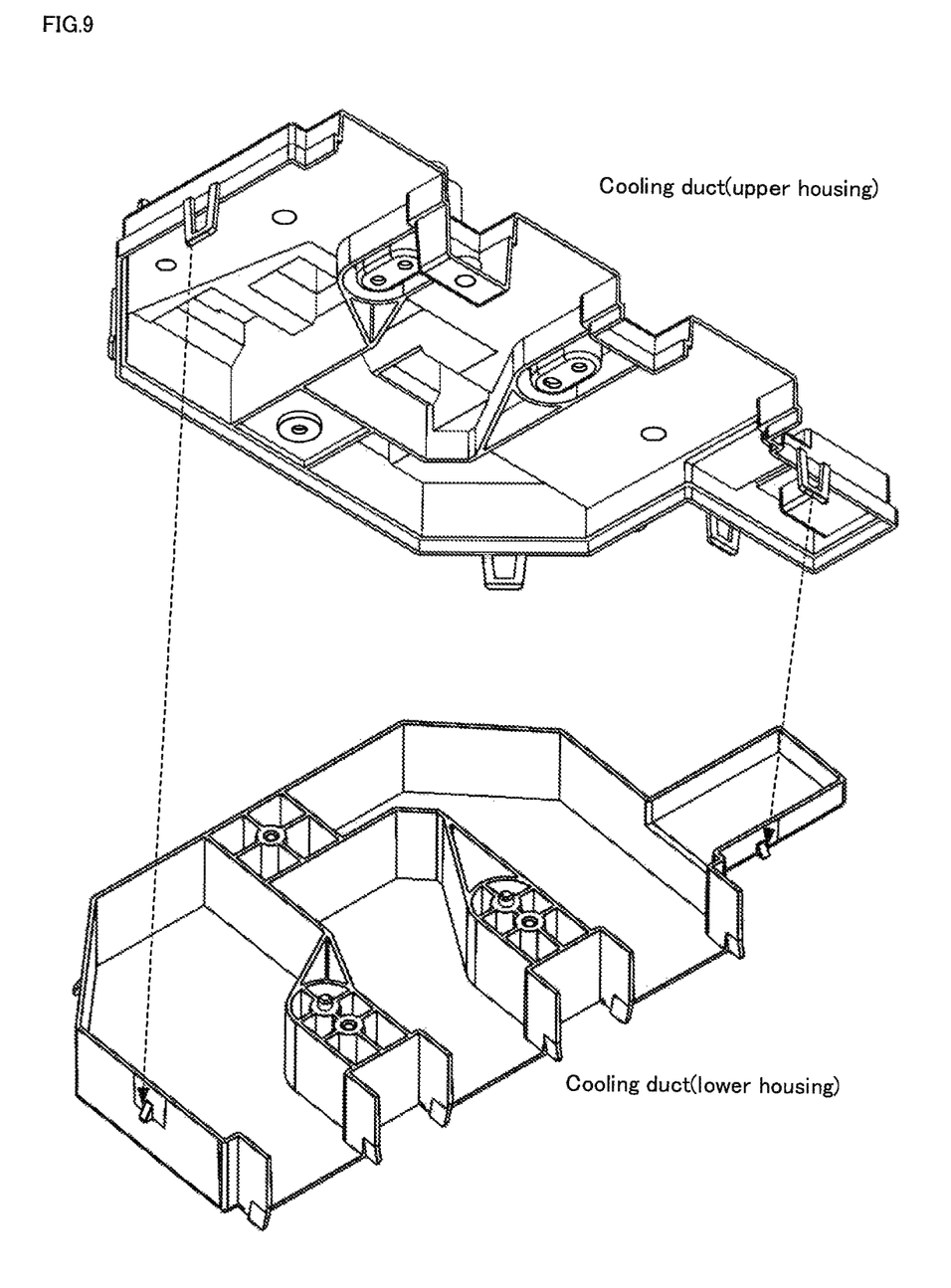
FIG. 9 is a diagram illustrating an example of the structure of the cooling duct shown in FIG. 6.
Figure 10:
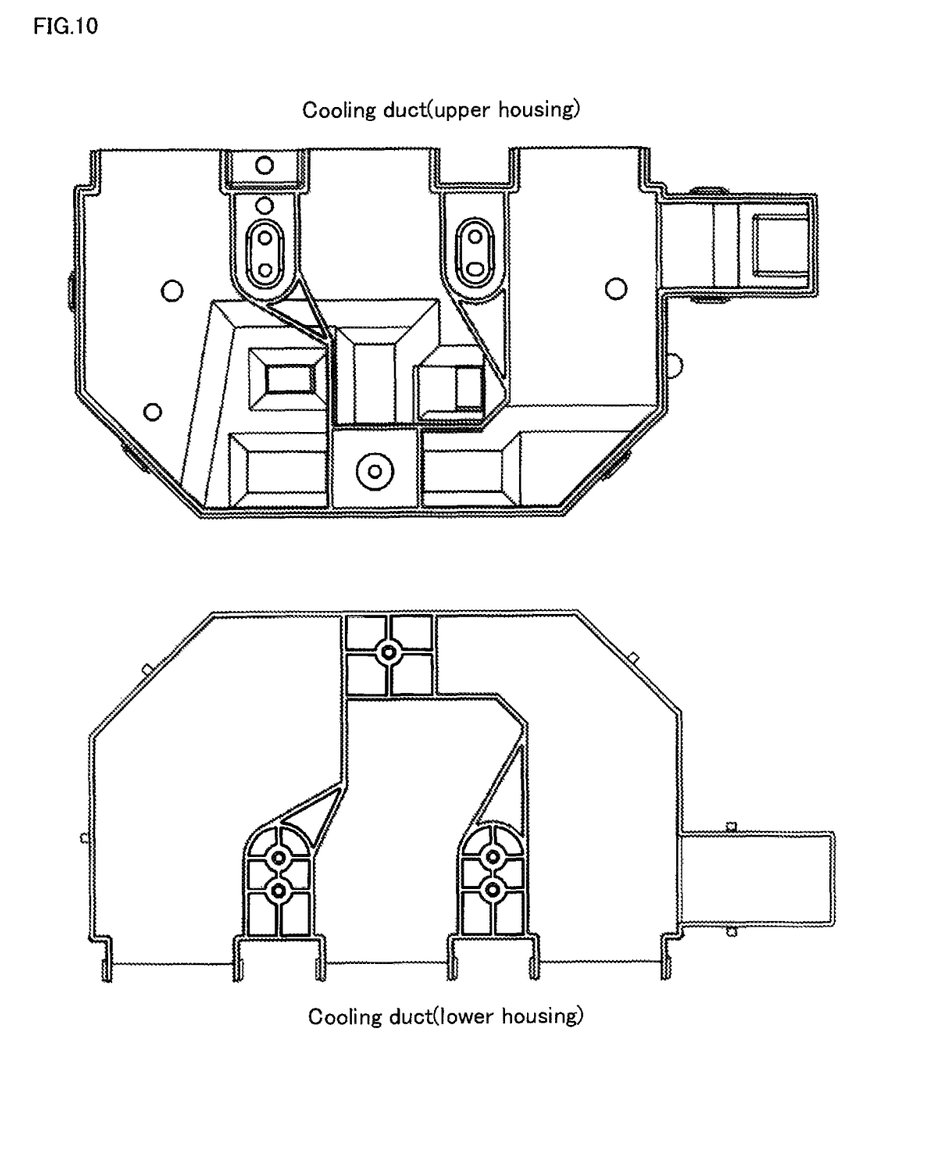
FIG. 10 is a diagram illustrating an example of the structure of the cooling duct shown in FIG. 6.
Figure 11:
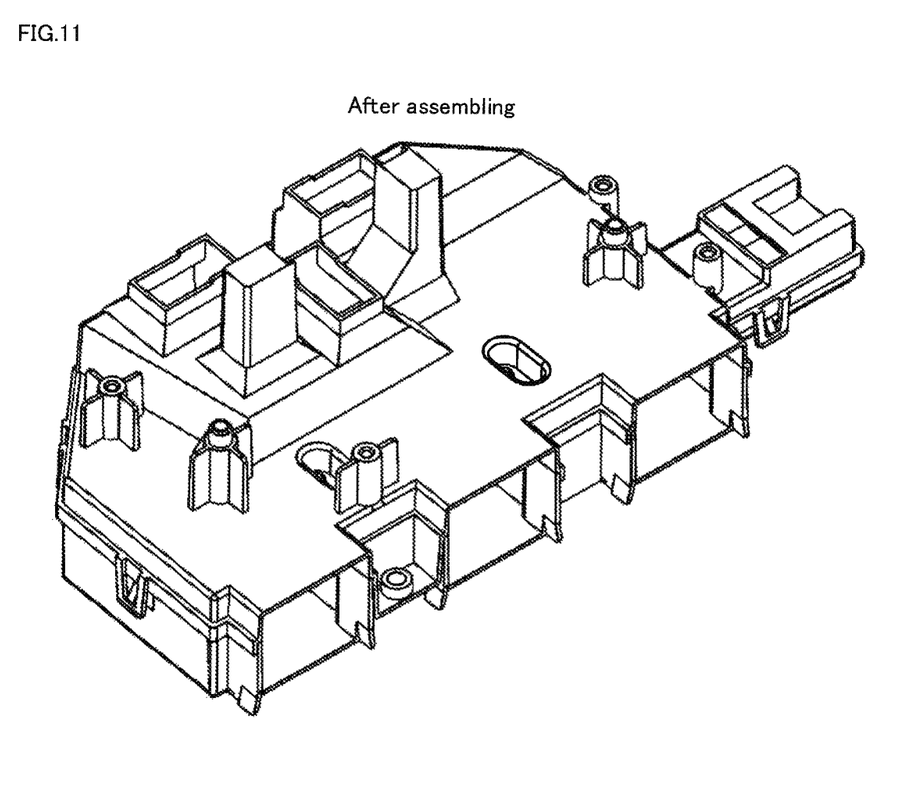
FIG. 11 is a diagram illustrating an example of the structure of the cooling duct shown in FIG. 6.

FIGS. 9 to 11 are diagrams illustrating an example of the structure of cooling duct 304 shown in FIG. 6. FIG. 9 is a perspective view of cooling duct 304 before assembling the upper housing and the lower housing. FIG. 10 is a plan view of cooling duct 304 before assembling the upper housing and the lower housing. FIG. 11 is a perspective view of cooling duct 304 after assembling the upper housing and the lower housing. The upper housing and the lower housing shown in FIG. 9 is assembled by fitting the portion of the claw in accordance with a broken line. As shown in FIGS. 9 to 11, in cooling duct 304, a space through which the cooling air blown out from each of fans 203 to 205 passes is provided separately.

In the present invention, along the long side of the illumination optical system optical layout becomes rectangular, fans for cooling the liquid crystal panel are arranged side by side. In this way, it is possible to secure a wider width of the flow path of the cooling duct than those arranged side by side the cooling fan on the short side. Further, the length of the flow path of the cooling duct from the cooling fan to the liquid crystal panel is shorter than that arranged side by side the cooling fan on the short side. Thus, it is possible to improve the cooling efficiency of the liquid crystal panel.

Further, a cooling duct is arranged in the bottom portion of the illumination optical system, on the side opposite to the projection lens side of the liquid crystal panel, the three blower fans are arranged in a direction in which the two liquid crystal panels face each other. Thus, by using a blower fan having a feature in which the direction of the intake air and the direction of the blowout are orthogonal, the width of the intake duct of the blower fan can also be ensured widely. Furthermore, when using blower fans for performing air intake from both sides, by providing a partition plate between the fan and the fan, it is possible to achieve further cooling efficiency. In addition, the three air outlets of the blower fans are aligned, and the cooling duct takes on a simple shape. Further, by this arrangement, the height of the top surface of the illumination optical system and the height of the blower fan are the same and it is thus possible to reduce the height of the projector apparatus.

Thus, it is possible to secure a wide width of the flow path of the cooling air in the cooling duct, to shorten the length of the flow path, by the air outlets of the fans which are aligned, and it is possible to improve configuration cooling efficiency. In addition, the number of fans can be increased to more than three. If the cooling efficiency is improved, the life cycle of the liquid crystal panel will be extended. Further, it is possible to reduce the rotational speed of the cooling fan and it thus becomes possible to reduce the annoying noise value. Further, the structure of the cooling duct itself and the structure for holding the cooling fan by aligning the air outlets of the blower fans can be improved and production efficiency therefore becomes simple. Further, by reducing the number of parts, it is possible to realize a reduction in the cost of all of the components that are used.

The invention claimed is:

1. An electronic device, comprising:
a plurality blowers, each of which has an air inlet for sucking air for blowing cooling air from the outside, wherein
the plurality of blowers cool each of three liquid crystal panels, mounted on an illumination optical system for outputting light to a projection lens for light modulation, and are disposed on a side opposite to a side where the projection lens of the three liquid crystal panels is disposed and are arranged side by side along a first direction facing the two liquid crystal panels of the three liquid crystal panels and are arranged such that a direction of the air inlets are in the first direction, and
a number of the blowers is three or more.

2. The electronic device according to claim 1, wherein
a height of the air outlet of the plurality of blowers are the same each other.

3. The electronic device according to claim 1, wherein
among the plurality of blowers, a distance from the air outlet of the blower that for cooling the liquid crystal panel other than the two liquid crystal panels facing each other of the three liquid crystal panels to the liquid crystal panel to be cooled by the blower is shorter than a distance from the air outlet of the other blower to the liquid crystal panel to be cooled respectively.

4. The electronic device according to claim 1, wherein
a position of the air outlet of the plurality of blowers in a direction perpendicular to the first direction are the same each other.

5. The electronic device according to claim 1, wherein
each of the plurality of the blowers comprises blower fans.

6. The electronic device according to claim 1, wherein
the plurality of blowers are disposed at intervals at which a predetermined intake amount can be ensured.

7. A projector, comprising:
an electronic device according to claim 1,
the projection lens; and
a light source, wherein
the electronic device receives light from the light source and modulates an incident light.

8. An electronic device, comprising:
a plurality of blowers, each of which has an air inlet for sucking air for blowing cooling air from the outside, wherein
the plurality of blowers cool each of three liquid crystal panels, mounted on an illumination optical system for outputting light to a projection lens for light modulation, and are disposed on the side opposite to the side where the projection lens of the three liquid crystal panels is disposed and are arranged side by side along a first direction facing the two liquid crystal panels of the three liquid crystal panels and are arranged such that the direction of the air inlets are the same as each other with respect to the first direction.

9. The electronic device according to claim 8, wherein
a height of the air outlet of the plurality of blowers are the same each other.

10. The electronic device according to claim 8, wherein
among the plurality of blowers, a distance from the air outlet of the blower that for cooling the liquid crystal panel other than the two liquid crystal panels facing each other of the three liquid crystal panels to the liquid crystal panel to be cooled by the blower is shorter than a distance from the air outlet of the other blower to the liquid crystal panel to be cooled respectively.

11. The electronic device according to claim 8, wherein
a position of the air outlet of the plurality of blowers in a direction perpendicular to the first direction are the same each other.

12. The electronic device according to claim 8, wherein
each of the plurality of the blowers comprises blower fans.

13. The electronic device according to claim 8, wherein
the plurality of blowers are disposed at intervals at which a predetermined intake amount can be ensured.

14. The electronic device according to claim 8, wherein
a number of the blower is three, each of the three blowers cools each of the three liquid crystal panels.

\* \* \* \* \*